(12) United States Patent
Gibson

(10) Patent No.: US 9,162,819 B2
(45) Date of Patent: Oct. 20, 2015

(54) BELT HAVING EMBEDDED TENSION MEMBERS

(71) Applicant: ARNTZ BETEILIGUNGS GMBH & CO. KG, Hoexter (DE)

(72) Inventor: Daniel Pattie Gibson, Hoexter (DE)

(73) Assignee: Arntz Beteiligungs GmbH & Co. KG, Hoexter (DE)

( * ) Notice: Subject to any disclaimer, the term of this patent is extended or adjusted under 35 U.S.C. 154(b) by 0 days.

(21) Appl. No.: 14/349,685

(22) PCT Filed: Oct. 4, 2012

(86) PCT No.: PCT/EP2012/004144
§ 371 (c)(1),
(2) Date: Apr. 4, 2014

(87) PCT Pub. No.: WO2013/050143
PCT Pub. Date: Apr. 11, 2013

(65) Prior Publication Data
US 2014/0262696 A1 Sep. 18, 2014

(30) Foreign Application Priority Data
Oct. 6, 2011 (DE) .......................... 10 2011 114 919

(51) Int. Cl.
*B65G 15/34* (2006.01)
*B65G 15/36* (2006.01)
(Continued)

(52) U.S. Cl.
CPC ................ *B65G 15/34* (2013.01); *B65G 15/36* (2013.01); *F16G 1/10* (2013.01); *F16G 1/12* (2013.01); *F16G 1/28* (2013.01); *F16G 5/08* (2013.01); *F16G 5/10* (2013.01); *F16G 5/20* (2013.01)

(58) Field of Classification Search
CPC .......... B65G 15/34; B65G 15/36; F16G 1/08; F16G 1/10; F16G 1/12; F16G 1/28; F16G 5/06; F16G 5/08; F16G 5/10; F16G 5/20

USPC ................................ 198/844.1, 847; 474/263
See application file for complete search history.

(56) References Cited

U.S. PATENT DOCUMENTS 3,138,962 A 6/1964 Haines et al.
3,349,634 A 10/1967 Terhune et al.
(Continued)

FOREIGN PATENT DOCUMENTS

DE            27 46 640          4/1978
DE   10 2010 043 322 A1   5/2012
(Continued)

*Primary Examiner* — Mark A Deuble
(74) *Attorney, Agent, or Firm* — Whitham Curtis Christofferson & Cook, PC

(57) ABSTRACT

In a force transmission belt or a conveyor belt, in particular a toothed belt, having a main belt body or a cord embedding zone made of a customary belt elastomer (20), in particular of polyurethane, and having at least one tension member of carbon cord (10; 1, 2) embedded in the elastomer (20), a material (30) is provided, which is enclosed between the strands (1) of the cord (10), and which could have been introduced by applying coatings onto strands (1) of the cord (10), for example. Said filler material (30), which is different from the elastomer (20) in which the carbon cord is embedded, consists of a composition of hydroxyaromates and aldehydes, without any addition of rubber or rubber latex, a hydroxyaromates-aldehyde resin that does not contain rubber, reaction products from hydroxyaromates or hydroxyaromates-aldehyde compositions with isocyanates or isocyanate prepolymers, and/or aromatically or polyaromatically cross-linked polyurethanes, or contains these substances. The elasticity of the carbon cord (10; 1, 2) is thus successfully maintained, good integration in the belt elastomer (20) is ensured, and the service time of the belt is substantially increased.

18 Claims, 1 Drawing Sheet

(51) Int. Cl.
*F16G 5/08* (2006.01)
*F16G 1/10* (2006.01)
*F16G 1/12* (2006.01)
*F16G 1/28* (2006.01)
*F16G 5/10* (2006.01)
*F16G 5/20* (2006.01)

(56) References Cited

U.S. PATENT DOCUMENTS

| | | |
|---|---|---|
| 3,862,882 A | 1/1975 | Marzocchi |
| 4,216,856 A * | 8/1980 | Moring et al. ............... 198/847 |
| 5,112,282 A * | 5/1992 | Patterson .................... 474/260 |
| 6,453,960 B1 * | 9/2002 | Kondo et al. ................. 152/451 |
| 7,056,249 B1 * | 6/2006 | Osako et al. ................. 474/260 |
| 2008/0032837 A1 * | 2/2008 | Unruh et al. ................. 474/143 |
| 2009/0142572 A1 | 6/2009 | Burlett |
| 2009/0227406 A1 * | 9/2009 | Wu et al. ..................... 474/238 |

FOREIGN PATENT DOCUMENTS

| | | |
|---|---|---|
| EP | 0 841 500 B1 | 5/1998 |
| EP | 1429046 A2 | 12/2003 |
| GB | 2 226 056 A | 6/1990 |
| WO | 2004/057209 A1 | 7/2004 |
| WO | 2010/133622 A1 | 11/2010 |
| WO | 2011/068729 A1 | 6/2011 |

* cited by examiner

BELT HAVING EMBEDDED TENSION MEMBERS

FIELD OF INVENTION

The invention relates to power-transmission belts or transport belts with a belt base or a cord-embedment zone made of a synthetic elastomer and with at least one tension-member system embedded into the elastomer. The elastomer is preferably a polyurethane or a similar polymer, as is known for belts in this connection. The tension-member systems are composed of a cord, which is composed of a plurality of individual strands, where the individual strands combined to give the cord include a material which differs from the elastomer of the belt base or of the embedment zone.

BACKGROUND

It is known in belt technology that tension-member systems can be embedded into a surrounding belt material in order to absorb tensile powers and in order to provide reempowerment. The belt material of the belt base is often composed of synthetic or other rubber, or of other polymers. Tension-member systems often used comprise cables made of synthetic fibers or steel, another term used for these in this connection being cord. A cable or cord can have been formed by various processes, which can involve one or more combined-group-twisting (laying) or braiding processes. Irrespective of the structure of the cable, a feature of all cords is that there are interstices within the volume of the cord. The manner of filling of said interstices greatly affects the properties of the tension-member system.

U.S. Pat. No. 3,138,962 B discloses a power-transmission belt in which, during the casting of the molding of the belt structure, the cord interstices are completely filled by a liquid castable polyurethane into which the cord is embedded. Although this initially leads to good binding of the cord into the material, there is a marked reduction of the lifetime of the belt under load. The belt urethane generally has a high coefficient of friction, and this type of polyurethane as fill material for the cord therefore leads to a loss of elasticity, to low flexibility, and to cord strand breakage caused by stiffening. This effect is particularly marked for carbon fibers and aramid fibers, since these are fine and are easily broken under load if they cannot slip over one another to a certain extent.

EP 0 841 500 B1 discloses a toothed belt made of an elastic polyurethane material which has tension members made of carbon-fiber cord, where the polyurethane material of the belt base penetrates into only a portion of the cord interstices, at least with about 0.2 mg of belt material per mm 3 of cord volume. The carbon cord can already have a size applied by the producer and made by way of example of an epoxide, the intention here being to prevent breakage of the fibers but not to seal the cord completely, but instead to leave spandrel-shaped interstices. A disadvantage is that the cord is bonded purely mechanically into the surrounding belt polyurethane, which retains its high coefficient of friction and has no contact to any other binding material.

In contrast, WO 2011/068729 A1 discloses that a tension-member system which has been embedded into the elastic structure of a belt and which by way of example can be a carbon cord can be provided with urea-crosslinked polyurethane impregnation that fills from 20 to 99% of the interstitial volume, and that the cord thus pretreated can then be embedded into an elastomeric belt structure. The polyurethane cast around the cord here can flow into the remaining interstices. The fill material made of urea-crosslinked polyurethane is produced via crosslinking of a polyurethane prepolymer with diamines or water. The specific fill material is intended to protect the cord fibers from breakage and give the entire cord substantially better elasticity and good flexural properties. A disadvantage is that the fill material for the cord interstices is cured separately prior to the embedment process and therefore does not bond fully satisfactorily to the surrounding belt elastomer.

SUMMARY

The object of the invention consists in improving the bonding of cord as tension-member system into conventional synthetic belt elastomers, in particular polyurethanes, and specifically polyurethane toothed belt materials, and thus to increase the lifetime of the belt. The object comprises, further and more specifically, the bonding of carbon cord into synthetic elastomers, in particular belt polyurethanes, and specifically toothed belt polyurethanes.

The object is achieved via a power-transmission belt or transport belt according to the features of claim 1 and a tension-member system according to the features of claim 12.

The power-transmission belt or transport belt according to this invention has a belt base or a cord-embedment zone made of a synthetic elastomer, preferably a polyurethane, and has, embedded into the polyurethane, at least one tension-member system made of a cord, strands of which include a material which differs from the elastomer of the belt structure or of the embedment zone. Complete inclusion of the material by cord strands is not necessary, but instead the material is, in general terms, present between the cord strands within the substantially cylindrical volume of the cord. The material present in the cord is a fill material for the cord interstices, and fills these entirely or to some extent. The material additionally present in the cord comprises, or is composed of:

compounds derived from hydroxyaromatics with aldehydes, but without addition of rubber or rubber latex,
a non-rubber-containing hydroxyaromatic-aldehyde resin,
reaction products of hydroxyaromatics or reaction products of hydroxyaromatics with aldehydes with isocyanates or isocyanate prepolymers, and/or
aromatically or polyaromatically crosslinked polyurethanes.

For the purposes of this invention, it is preferable to use resorcinol as hydroxyaromatic. In general terms, however, it is possible for the purposes of this invention to select one or more hydroxyaromatics from the following group: resorcinol, phenol, hydroquinone, cresol, bisphenol A, and other bishydroxyphenylalkanes or hydroxyphenylalkanes inclusive of the derivatives of said substances, where these derivatives are suitable for crosslinking and condensation and for reaction with isocyanates.

In a particularly preferred embodiment, the hydroxyaromatics and dihydroxyaromatics, and the phenols, are used in the form of condensates in the fill material. Suitable condensates are in particular those produced via condensation reactions with aldehydes, preferably with formaldehyde. For the purposes of the invention, particular preference is given to condensation products of this type with an excess of aromatic, which remain thermoplastic and which, as di- or polyhydroxy compounds, can undergo reaction with isocyanates or in reactive polyurethane (PU) compositions. These compounds preferably take the form of chains, being uncrosslinked and liquid to viscous. In general terms, all hydroxyaromatic-aldehyde resins have good suitability for the invention.

For the purposes of the invention, particular preference is given to resorcinol-formaldehyde compounds, phenol-formaldehyde compounds, and phenol-resorcinol-formaldehyde compounds, for example in the form of oligo-condensates and of novolaks. Other suitable materials are crosslinked hydroxyaromatic-aldehyde resins preferably retaining plastic properties, in particular resorcinol-formaldehyde resins, phenol-formaldehyde resins, and phenol-resorcinol-formaldehyde resins. These resins are preferably soft high-viscosity materials, and do not therefore impair the freedom of motion of, and elasticity of, the cord fibers. The resins are post-curable, and in contact with the belt elastomer give a good hardened product, particularly if the belt elastomer is a polyurethane, by way of reactive groups which, during casting of the molding, are still present in said polyurethane.

Other suitable fill materials are reaction products of hydroxyaromatics or hydroxyaromatic-aldehyde compounds with isocyanates or with isocyanate prepolymers. Among these, particular preference is in turn given to products of this type using resorcinol, in particular resorcinol-formaldehyde compounds and resins, and preference is further given to phenol-formaldehyde compounds and resorcinol-phenol-formaldehyde compounds respectively in combination with isocyanates or with isocyanate prepolymers.

In general terms, all aromatic or polyaromatically crosslinked polyurethanes are considered to be advantageous fill materials for the purposes of this invention. The fill materials can be combined with one another.

Other fill materials that can be used would in principle be known RFL materials, e.g. the fill materials of the invention in combination with rubber or rubber latex. However, it has been found that fill materials of this type do not have good compatibility with synthetic elastomers, in particular with the conventional belt polyurethanes.

The belts of the invention have many advantages. Firstly, it is possible to adjust the fill material, specifically when condensation levels of the hydroxyaromatics are low, in such a way that the fill material remains soft and elastic, thus giving optimized retention of the flexibility of the cord. The fill material here is simultaneously suitable as size for delicate cord fibers, such as carbon fibers and aramid fibers.

It is also possible to adjust the fill material so that it is harder, if the belt application and belt type requires this, as long as said material is suitable for the abovementioned purposes. Condensation levels of the hydroxyaromatic compounds can be selected accordingly.

During the casting process to mold the belt structure or the cord-embedment zone from a belt polyurethane, the reactivity of the polyurethane composition prior to hardening is sufficient for bonding to the fill material, and there is therefore a chemical linkage present in addition to the mechanical bonding of the cord into the material of the belt structure or of the embedment zone. However, the linkage arises only at the interfaces, to the extent that the belt polyurethane penetrates into the cord, and fill material present in the core region of the cord or in interstices not filled by belt polyurethane can therefore continue to exert its full elasticity-increasing effect.

In an embodiment of the invention, the manner of embedment of the cord is such that the elastomer of the belt base or of the cord-embedment zone is present in interstices between strands of the cord in the peripheral region of the cord. This embedment relates at least to the external grooves of the cord. According to one preferred embodiment, the belt elastomer fills these.

Alternatively, it is possible that the particular fill material according to the invention completely fills the interstices of the cord, or indeed encloses these, thus providing complete sheathing of the cord.

According to another preferred embodiment, the material (fill material) differing from the elastomer of the belt structure or of the embedment zone coats one or more strands and/or the entire cord.

According to particularly preferred embodiments, the fill material coats only individual strands in the core of the cord.

According to another aspect of the invention, the particular material occupying the interstices of the cord fills at least 20% of the volume of the interstices.

According to another aspect of the invention, the cord comprises less than 0.29 mg, preferably less than 0.20 mg, more preferably less than 0.18 mg, of the belt elastomer per $mm^3$ of cord volume. It is moreover particularly preferable here that at least 60%, with preference at least 80%, of the interstice volume not occupied by the belt elastomer is filled or occupied by the included fill material. These measures provide particularly good binding of any cord material into a belt elastomer surrounding the cord, even when a relatively stiff belt elastomer is involved here, or in particular polyurethane with relatively high coefficient of friction.

In one particularly preferred embodiment, the tension-member systems comprise carbon fibers or are composed entirely thereof. Preference is equally given to tension-member systems made of carbon fibers in a mixture with synthetic fibers, such as aramid fibers, polyamide fibers, polyester fibers, etc.

In an alternative embodiment, the tension-member systems can also be composed of steel wire, in particular metal-coated steel wire, or of technical fibers, such as aramid fibers, polyamide fibers, polyester fibers, and other fiber materials known for tension-member systems. The fibers can also be used in a form mixed with one another or can be used in, or with, copolymers. Combinations of said tension-member-system materials with carbon fibers are equally possible. The "mixing" of various fiber materials and/or wire materials can by way of example be achieved by twisting these together to give strands.

The power-transmission belt or transport belt can preferably be a toothed belt. However, the invention also has excellent suitability for V-belts, V-ribbed belts, or flat belts.

It is preferable that the synthetic elastomer of the belt base or of the cord-embedment zone is a polyurethane. The belt polyurethane can be any polyurethane suitable for power-transmission belts or for transport belts, as is known to the person skilled in the art. It does not therefore require any further description here.

The belt can preferably have a protective textile covering at least on one side and in particular on the power-transmission side.

The achievement of the object moreover comprises a tension-member system made of a cord, between strands of which there is a material present which differs from the elastomer of the belt structure or of the cord-embedment zone, where the material included into the cord or present between the strands comprises, or is composed of compounds derived from hydroxyaromatics with aldehydes without addition of rubber or rubber latex,
a non-rubber-containing hydroxyaromatic-aldehyde resin,
reaction products of hydroxyaromatics or hydroxyaromatic-aldehyde compounds with isocyanates or with isocyanate prepolymers, and/or
aromatically or polyaromatically crosslinked polyurethanes.

The material can preferably fill the tension-member system to an extent of from 10 to 90%, and this means that the material fills from 10 to 90% of the volume of the interstices.

The fill material can moreover also sheath the tension-member system. In general terms, the manner of introduction of the fill material into the tension-member system can be such that the fill material coats all, or individual, strands of the cord. As described above, the tension-member system is preferably composed of carbon fibers or comprises these in a mixture with other fibers.

In other respects, the isolated tension-member system can exhibit all of the other features that have already been described in connection with the embedded tension-member system for the belt of the invention.

DESCRIPTION OF THE DRAWINGS

The invention is described below by reference to embodiments which serve merely for illustrative purposes and do not restrict the scope of the invention, as described above.

DESCRIPTION

Figure 1:
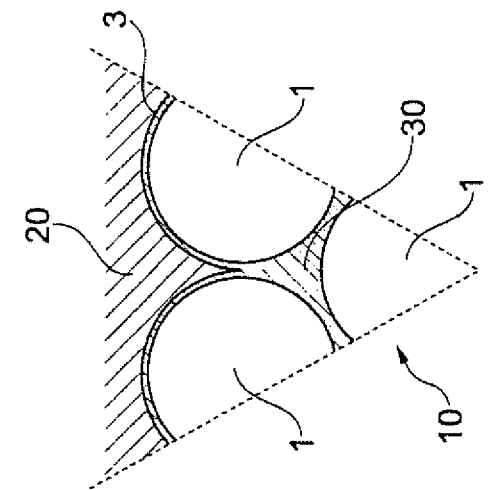
FIGS. 1 to 3 show sectors of various cord cross sections relating respectively to filled cord enclosed in polyurethane.

FIG. 1 is a cross-sectional view showing only one segment of a cord 10, mainly a first embodiment of a cord 10 embedded in polyurethane with the strands 1 and carbon fibers 2 indicated therein. The cord is embedded into a polyurethane material 20, which extends as far as the exterior grooves of the cord 10 between the strands 1. It has an interface with the material 30, differing from the belt polyurethane and included in the cord 10, and present as a discernible spandrel-shaped interstice between the three cord strands 1 in the cross-sectional view. According to this embodiment, the fill material 30 provides optimized protection of the carbon fibers 2. Nevertheless, the relatively large interface 3 between polyurethane 20 and fill material 30 provides good linkage between the materials.

Figure 2:
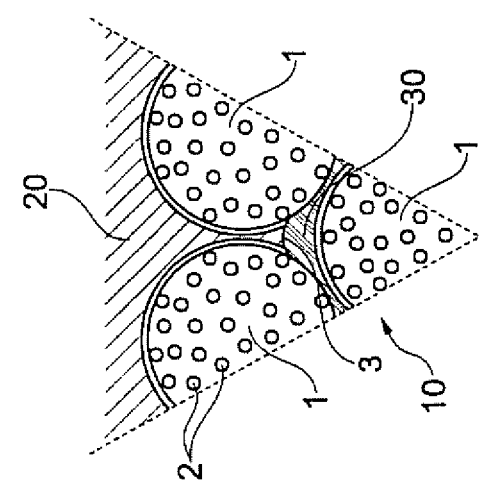

FIG. 2 shows another embodiment. In this example, the fill material 30 is present as coating on one of the inner strands 1, and the polyurethane 20 in the peripheral region of the cord can therefore penetrate more deeply into the interstices between the exterior strands 1 of the cord material. This embodiment provides optimized mechanical interlocking between the cord strands 1 and the belt-base polyurethane 20 which embeds the cord 10. Nevertheless, the elasticity of the cord 10 is ensured by the fill material 30, and linkage is provided between fill material 30 and polyurethane 20 at the shared interface 3.

Figure 3:
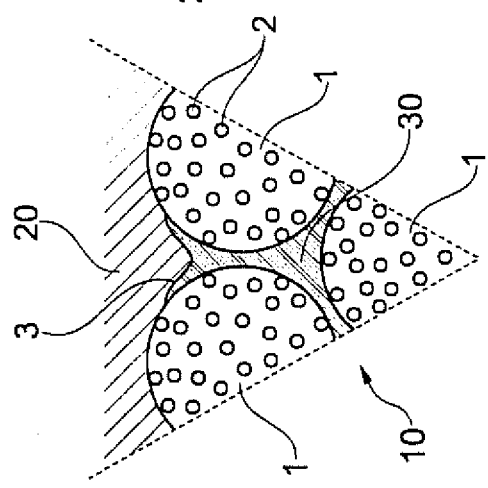

FIG. 3 shows a third embodiment in which the fill material 30 coats all of the strands 1 shown of the cord 10. The fill material 30 thus at the same time sheaths the cord 10, and a very large surface 3 is provided in relation to the polyurethane 20, i.e. an enlarged linkage area or enlarged adhesion area between fill material 30 and polyurethane 20.

Many other embodiments are conceivable. By way of example, the fill material can coat the cord more thinly, in such a way that unfilled inner interstices also remain between the cord strands.

The cord can be produced by using the specific fill material according to the invention to coat individual strands, fibers, or filaments, and/or the entire cord strand, and by way of example this can be achieved via immersion in a solution of the fill material, and by way of alternative this type of coating can be applied via spraying onto the individual strands and/or the entire cord material. An alternative production procedure consists in introducing the fill material in the form of soft to elastically dimensionally stable material, for example in filamental form or in the form of casting composition, during the twisting, laying, or braiding of the cord strand before the strands are finally combined.

What is claimed is:

1. A power-transmission belt or transport belt with a belt base or a cord-embedment zone made of a synthetic elastomer and with, embedded into the synthetic elastomer, at least one tension-member system made of a cord, wherein the cord is comprised of strands which define an interstice volume therebetween and a fill material, wherein at least a portion of the fill material is positioned in the intersice volume between the strands, and wherein the fill material differs from the synthetic elastomer, wherein the cord of the at least one tension-member system includes less than 0.20 mg of the synthetic elastomer of the belt base or cord embedment zone per $mm^3$ of cord volume and wherein the fill material present in the cord is selected from the group consisting of:
    a) compounds derived from hydroxyaromatics with aldehydes, without addition of rubber or rubber latex,
    b) a non-rubber-containing post-curable hydroxyaromatic-aldehyde resin, and
    c) reaction products of hydroxyaromatics or hydroxyaromatic-aldehyde compounds with isocyanates or with isocyanate prepolymers.

2. The power-transmission belt or transport belt as claimed in claim 1, wherein the manner of embedment of the cord is such that synthetic elastomer of the belt base is present in the interstice volume between strands of the cord in a peripheral region of the cord.

3. The power-transmission belt or transport belt as claimed in claim 1, wherein the fill material differing from the synthetic elastomer of the belt base or of the cord-embedment zone coats one, a plurality, or all of the strands of the cord.

4. The power-transmission belt or transport belt as claimed in claim 1, wherein the fill material differing from the synthetic elastomer of the belt base or of the cord embedment zone coats only strands in a core of the cord.

5. The power-transmission belt or transport belt as claimed in claim 1, wherein the fill material occupying the interstice volume of the cord fills at least 20% of the interstice volume.

6. The power-transmission belt or transport belt as claimed in claim 1, wherein the at least one tension-member system comprises, or is composed of one or more of aramid fibers, polyamide fibers, polyester fibers, carbon fibers, steel wire, and metal-coated steel wire.

7. The power-transmission belt or transport belt as claimed in claim 1, wherein the synthetic elastomer of the belt base or of the cord-embedment zone is a polyurethane.

8. The power-transmission belt or transport belt as claimed in claim 1, wherein the at least one tension-member system comprises, or is composed of one or more of aramid fibers, polyamide fibers, and polyester fibers within copolymers or in a mixture with copolymers.

9. A tension-member system made of a cord, wherein the cord is comprised of strands which define an interstice volume therebetween and a fill material positioned in at least a portion of the interstice volume, wherein the fill material is composed of one of the materials selected from the group consisting of
    a) compounds derived from hydroxyaromatics with aldehydes, without addition of rubber or rubber latex,
    b) a non-rubber-containing post-curable hydroxyaromatic-aldehyde resin, and
    c) reaction products of hydroxyaromatics or hydroxyaromatic-aldehyde compounds with isocyanates or with isocyanate prepolymers.

10. The tension-member system as claimed in claim 9, wherein the strands of the cord comprise, or are composed of, carbon fibers.

11. The tension-member system as claimed in claim 10, wherein the strands of the cord further comprise at least one of aramid fibers, polyamide fibers, polyester fibers, carbon fibers, steel wire, and metal-coated steel wire.

12. The tension-member system as claimed in claim 10, wherein the strands of the cord further comprise one or more of aramid fibers, polyamide fibers, and polyester fibers within copolymers or in a mixture with copolymers.

13. The tension-member system as claimed in claim 9 wherein said fill material is said reaction products of hydroxyaromatics or hydroxyaromatic-aldehyde compounds with isocyanates or with isocyanate prepolymers.

14. The tension-member system as claimed in claim 13 wherein said reaction products are oligo-condensates or novolaks.

15. The power-transmission belt or transport belt as claimed in claim 14, wherein the tension-member system is composed of two or more different fibers or wires selected from the group consisting of aramid fibers, polyamide fibers, polyester fibers, carbon fibers, steel wire and metal-coated steel wire.

16. The tension-member system as claimed in claim 9 wherein the fill material coats one, a plurality, or all of the strands of the cord.

17. The tension-member system as claimed in claim 9 wherein the fill material coats only strands in a core of the cord.

18. The tension-member system as claimed in claim 9 wherein the fill material fills at least 20% of the interstice volume.

* * * * *